(12) United States Patent
Oswald et al.

(10) Patent No.: US 7,126,318 B2
(45) Date of Patent: Oct. 24, 2006

(54) HIGHER ORDER SLOPE COMPENSATION FOR FIXED FREQUENCY CURRENT MODE SWITCHING REGULATORS

(75) Inventors: Richard K. Oswald, San Jose, CA (US); Tamotsu Yamamoto, Cupertino, CA (US); Mikio Motomori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/210,846

(22) Filed: Aug. 25, 2005

(65) Prior Publication Data

US 2006/0043951 A1    Mar. 2, 2006

(51) Int. Cl.
*G05F 1/40* (2006.01)
(52) U.S. Cl. ..................... 323/288; 323/285
(58) Field of Classification Search ............. 323/288, 323/284, 285
See application file for complete search history.

(56) References Cited

U.S. PATENT DOCUMENTS

| | | | |
|---|---|---|---|
| 4,143,314 A * | 3/1979 | Gruber | 323/288 |
| 4,727,308 A | 2/1988 | Huljak et al. | |
| 4,943,902 A | 7/1990 | Severinsky | |
| 5,479,090 A | 12/1995 | Schultz | |
| 5,600,234 A | 2/1997 | Hastings et al. | |
| 5,929,620 A | 7/1999 | Dobkin et al. | |
| 5,949,229 A | 9/1999 | Choi et al. | |
| 5,982,160 A | 11/1999 | Walters et al. | |
| 6,046,516 A | 4/2000 | Maier et al. | |
| 6,066,943 A | 5/2000 | Hastings et al. | |
| 6,313,610 B1 | 11/2001 | Korsunsky | |
| 6,366,070 B1 | 4/2002 | Cooke et al. | |
| 6,404,261 B1 | 6/2002 | Grover et al. | |
| 6,476,589 B1 | 11/2002 | Umminger et al. | |
| 6,541,947 B1 | 4/2003 | Dittmer et al. | |
| 6,744,241 B1 | 6/2004 | Feldtkeller | |
| 6,828,766 B1 | 12/2004 | Corva et al. | |
| 6,873,140 B1 | 3/2005 | Saggini et al. | |
| 6,894,471 B1 | 5/2005 | Corva et al. | |
| 7,030,596 B1 | 4/2006 | Salerno et al. | |

* cited by examiner

*Primary Examiner*—Shawn Riley
(74) *Attorney, Agent, or Firm*—McDermott Will & Emery LLP (57) ABSTRACT

A method of generating a slope compensation signal for use in a current mode switching regulator. The method includes the steps of summing a clock signal and a reference signal so as to generate a linear ramp signal; generating a non-linear signal from the linear ramp signal; multiplying a correction signal with an input voltage signal so as to generate a signal which varies based on a measured value of a current flowing within the current mode switching regulator; summing a first voltage signal corresponding to the non-linear correction signal and a second voltage signal indicating the difference between an actual voltage level of the current mode switching regulator and the desired voltage level of the current mode switching regulator so as to generate a first output signal which represents the second voltage signal minus the first voltage signal; and comparing the first output signal and the measured value of a current flowing within the current mode switching regulator, and generating a second output signal utilized to control current flow within the current mode switching regulator based on the result of the comparison.

19 Claims, 6 Drawing Sheets

HIGHER ORDER SLOPE COMPENSATION FOR FIXED FREQUENCY CURRENT MODE SWITCHING REGULATORS

FIELD OF DISCLOSURE

This disclosure generally relates to improved switching regulator circuits, and more specifically, to methods and circuits to effectively implement higher order slope compensation in fixed frequency current mode switching regulator circuits.

BACKGROUND OF THE DISCLOSURE

Current-mode switching regulators operate to provide a substantially constant output voltage to a load from a voltage source that may be poorly-specified or fluctuating. As is well known, in a current mode switching regulator, the flow of current to the load is provided in the form of discrete current pulses, and governed by a controller. The controller functions to measure the current flow within the regulator, and operate a switch contained within the regulator to control the current supply based on this measured current. By controlling the duty cycle of this switch, i.e., the percentage of time that the switch is ON relative to the total period of the switching cycle, the amount of current supplied by switching regulator can be regulated so as to provide the desired output level.

In current-mode switching voltage regulators, which utilize current programmed control, there is an inherent instability when the duty cycle exceeds 50% with fixed frequency and continuous inductor current mode, and 67% with fixed frequency and discontinuous inductor current mode (i.e., when the switch is ON for more than 50% or 67% of a given switching period). In order to maintain stability of such current-mode switching regulators, the current-derived signal used to control the regulator is modified by, for example, applying a slope compensation signal.

Figure 1A:
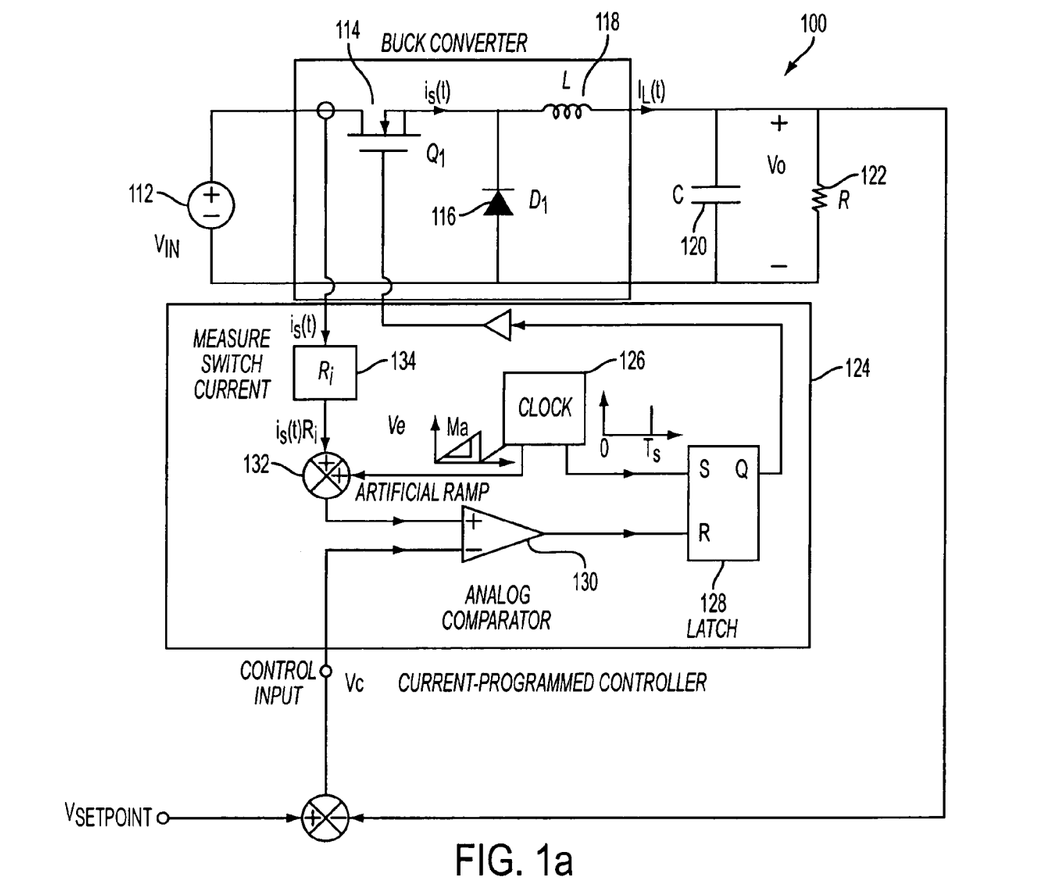
FIG. 1a illustrates an example of a prior art buck-configuration current-mode switching regulator utilizing slope compensation.

FIG. 1a shows an example of a known buck-configuration current-mode switching regulator 100 utilizing slope compensation (see, *Erickson's: Fundamentals of Power Electronics*, 2nd Edition, pages 446–448). The switching regulator 100 includes a voltage source 112, a switch 114, a diode 116, an inductor 118, a capacitor 120, a load 122 and a current controller circuit 124 coupled together in the manner shown in FIG. 1. The current controller circuit 124 includes a timing circuit 126 that is capable of producing linear ramp and clock digital signals, a latch 128, a comparator 130, a summer 132 and a scaling resistor 134. As shown, the latch 128 receives an input signal from the timing circuit 126 which functions to set the latch 128. When the latch 128 is set, it causes the switch 114 to turn on and provide current from the voltage source 112 to the output load 122. Latch 128 remains set until an output signal from the comparator 130 causes the latch 128 to reset. When reset, the latch 128 turns switch 114 off so that current is no longer drawn from the voltage source 112.

Figure 1B:
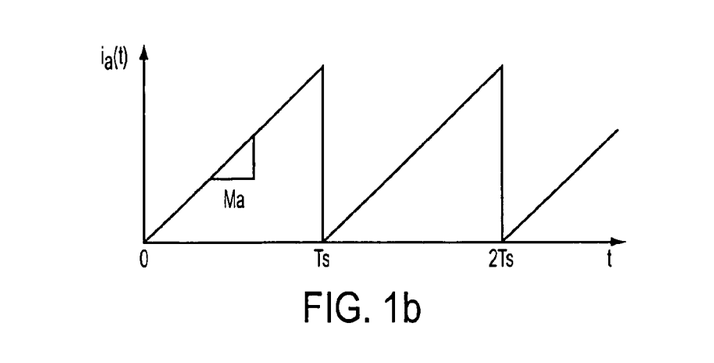

The timing circuit 126 also generates a linear slope compensation signal, which is coupled to one input of the summer 132. The slope compensation signal is illustrated in FIG. 1b. The other input of the summer 132 receives a signal indicating the current supplied to the output load 122. The output of the summer 132 is coupled to one input of the comparator 130. The other input to the comparator 130 is a control signal, Vc, indicating the difference between the desired (i.e., $V_{SETPOINT}$) and actual voltage (i.e., Vo) levels to be supplied to the load 122. Comparator 130 determines when to reset latch 128 by comparing a signal that is the combination of the signal representing the measured current and the linear slope compensation signal (i.e., the output of summer 132) and the control signal, Vc.

As noted above, it is well known in the prior art that slope compensation can be applied to the switching regulator controllers to avoid sub-harmonic oscillation instability of the duty cycle with respect to the switching frequency when the nominal duty cycle exceeds 50%.

As set forth by Erickson, for buck converters the boundary of stability with slope compensation is stated as:

$$1 = \frac{S_f - S_e}{S_r + S_e}, \quad (1)$$

in the notation where:
$$\begin{bmatrix} S_f = \text{falling current slope} = M_2 = \frac{V_0}{L} \\ S_r = \text{rising current slope} = M_1 = \frac{V_{IN} - V_0}{L} \\ S_e = \text{external compensation ramp slope} = M_a \end{bmatrix}$$

Thus the required compensation ramp slope for stability is:

$$S_e = \frac{S_f - S_r}{2} = \frac{2V_0 - V_{IN}}{2L} = \frac{(2D-1)V_{IN}}{2L}, \quad (2)$$

$$\left(\text{since } D = \frac{V_0}{V_{IN}}, \text{ and } D(t) = \frac{t}{T_s} \text{ for } 0 \le t \le T_s \text{ in each control cycle}\right)$$

Figure 2A:
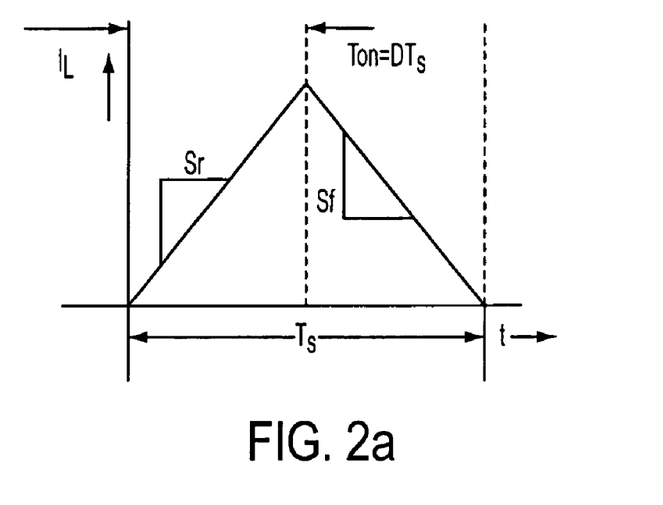
FIG. 2a illustrates an exemplary current signal delivered to a load by a current mode switching regulator during a given clock cycle.
Figure 2B:
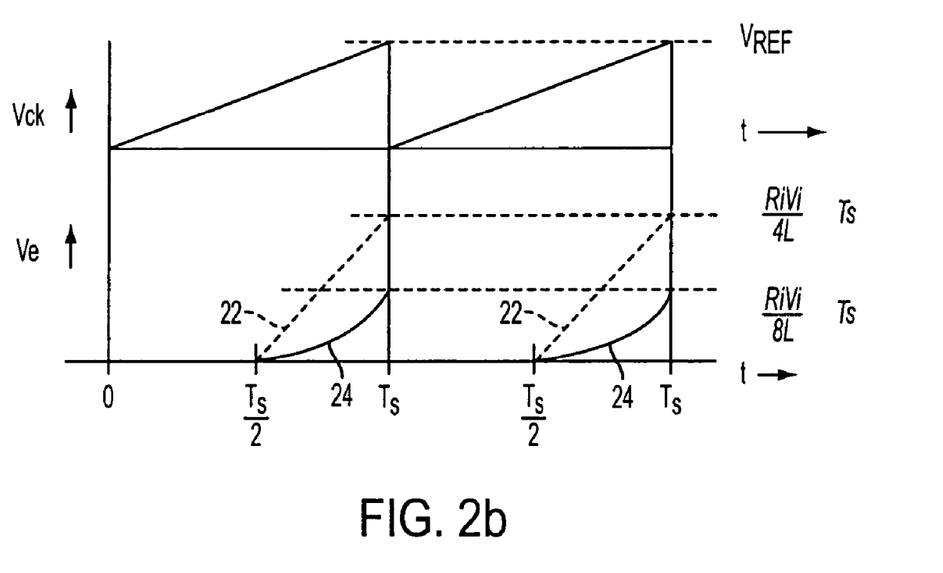
FIG. 2b illustrates examples of a linear slope compensation signal and a non-linear slope compensation signal.

Se is the slope of the current compensation ramp Ve, so the scaling factor to obtain the signal voltage is Ri, the same factor as the current sense scaling. Thus:

$$\frac{d}{dt}V_e = \quad (3)$$

$$Ri * S_e = \frac{R_i V_{IN}}{2L}(2D - 1) = \frac{RiVIN}{L}\left(\frac{t}{T_s} - 1/2\right) = \frac{RiV_{IN}}{L}\left(\frac{V_{CK}}{V_{REF}} - 1/2\right)$$

where referring to FIG. 2b, $V_{CK}=(V_{REF}/Ts)*t$, for $0 \le t \le Ts$. Accordingly, for stability, the compensation ramp slope can be zero until:

$$t = \frac{T_s}{2}, (D = 0.5), \quad (4)$$

and then must increase proportional with t, to a maximum of:

$$\frac{V_{IN}}{2L} \text{ at } t = T_s. \quad (5)$$

Thus:

$$Ve(t) = \frac{RiV_{IN}}{L}\int_{\frac{T_s}{2}}^{t}\left(\frac{t - \frac{T_s}{2}}{T_s}\right)dt = \frac{RiV_{IN}\left(t - \frac{T_s}{2}\right)^2}{2LT_s}, \text{ for } T_s/2 \le t \le T_s, \quad (6)$$

and $Ve(t) = 0$ for $t \le T_s/2$ \quad (7)

The preceding equations defining the waveforms are illustrated in FIGS. 2a and 2b. Specifically, FIG. 2a illustrates the current signal, $I_L$, delivered to the load during an exemplary clock cycle, $T_s$. As shown, $I_L$ exhibits a rising slope Sr during the period the switch 114 is on, and exhibits a decreasing slope Sf during the period the switch 114 is off. FIG. 2b illustrates two slope compensation signals. The first slope compensation signal, which is typically utilized in known devices, exhibits a linear increase (see, dashed-line 22). The second and more desirable slope compensation signal exhibits a non-linear increase (see, solid line 24).

As noted, the present design practice is usually to make the slope of the compensation signal constant at the maximum value required for a duty cycle equal to 100% (i.e., D=1) so that the waveform is an easy to generate linear ramp as illustrated in FIG. 2b, element 22. However, the condition necessary for stability is a non-linear function as indicated by element 24 of FIG. 2b. The non-linear function of the slope compensation signal as shown in equation (6), when evaluated at $t=T_s$, has the value:

$$Ve(t) = \frac{R_i V_{IN}}{2LT_s}\left(t - \frac{Ts}{2}\right)^2 = \frac{R_i V_{IN}}{8L} T_s \text{ at } t = Ts \quad (8)$$

A linear ramp of the same maximum slope required for stability (i.e., 22 of FIG. 2b) would have a value of:

$$\frac{R_i V_{IN}}{2L}\left(\frac{Ts}{2}\right) = \frac{R_i V_{IN} Ts}{4L} \text{ at } t = Ts, \quad (9)$$

or twice as large a correction amplitude as needed with the second order compensation ramp. It is noted that larger correction amplitudes of the compensation ramp increase dynamic signal range requirements in the controller and make it more difficult to obtain large load currents, especially when $V_{OUT}$ is nearly equal to $V_{IN}$ and D→1.

In other words, by utilizing a linear slope compensation signal and providing enough slope compensation to handle the worst case scenario, which is 100% duty cycle, the dynamic range of the controller is unnecessarily reduced when the regulator is operating at a duty cycle of less than 100%. As is known, the amount of slope compensation necessary to provide stability increases as the duty cycle increases. In view of the foregoing, it is desirable to provide only the amount of slope compensation actually required to prevent instability so as to not degrade the dynamic range of the controller.

SUMMARY OF THE INVENTION

In view of the foregoing, it is a primary objective of the invention to solve the foregoing problems and provide a method and apparatus that allows for the addition of only the amount of slope compensation necessary to maintain stability of the regulator. In other words, the amount of slope compensation provided by the present invention varies in accordance with variations in the duty cycle during operation of the regulator. Moreover, the present invention provides for a varying slope compensation signal utilizing a simple, cost effective circuit, which results in practical solution to the aforementioned problems.

According to one embodiment, the present invention relates to a method of generating a slope compensation signal for use in a current mode switching regulator. The method includes the steps of summing a clock signal and a reference signal so as to generate a signal that is zero in the interval from 0 to Ts/2 and a linear ramp signal from Ts/2 to Ts; multiplying the linear ramp signal with an input voltage signal so as to make the magnitude of the linear ramp signal vary proportional to the measured value of a current flowing within the current mode switching regulator; taking the time integral of this signal to create a non-linear signal; summing a first voltage signal corresponding to the non-linear signal and a second voltage signal indicating the difference between an actual voltage level of the output of the current mode switching regulator and the desired output voltage level of the current mode switching regulator so as to generate a first output signal which represents the second voltage signal minus the first voltage signal; and comparing the first output signal and the measured value of a current flowing within the current mode switching regulator, and generating a second output signal utilized to control current flow within the current mode switching regulator based on the result of the comparison.

In another embodiment, the present invention relates to a slope compensation circuit for use in a current mode switching regulator. The slope compensation circuit includes a first summer circuit for receiving a clock signal and a reference signal as input signals, and for generating a linear signal as an output signal; a multiplier circuit for multiplying said linear signal with an input voltage signal, generating a signal which varies proportional to the measured value of a current flowing within said current mode switching regulator; an integrator circuit for taking the time integral of the multiplier output; a second summer circuit for receiving a first non-linear voltage signal corresponding to said integrator output signal and a second voltage signal indicating the difference between an actual voltage level of said current mode switching regulator and the desired voltage level of said current mode switching regulator, and for generating an output signal which represents the second voltage signal minus the first voltage signal; and a comparator for receiving the output signal from said second summer as a first input, and said measured value of a current flowing within said current mode switching regulator as a second input, and for generating an output signal utilized to control current flow within said current mode switching regulator.

The slope compensation circuit of the present invention provides numerous advantages over the prior art. One advantage is that the amount of slope compensation provided by the present invention varies in accordance with variations in the duty cycle during operation of the regulator such that only the amount of slope compensation necessary to prevent instability is provided. As such, there is no degradation in the dynamic range of the controller, which results when slope compensation in excess of what is required is provided to the regulator.

Another advantage of the present invention is that the variable slope compensation signal is provided utilizing a simple, cost effective circuit, thereby providing a practical solution to the aforementioned problems of the prior art. This is accomplished in part due to the fact that the controller of the present invention only requires the high-side switch current and output voltage as measured variables.

Additional objects, advantages, and novel features of the invention will become apparent to those skilled in the art upon examination of the following description, or may be learned by practice of the invention. While the novel features of the invention are set forth below, the invention, both as to organization and content, will be better understood and appreciated, along with other objects and features thereof, from the following detailed description taken in conjunction with the drawings.

BRIEF DESCRIPTION OF THE DRAWINGS

The accompanying drawings, which are incorporated into and form a part of the specification, illustrate several aspects and embodiments of the present invention and, together with the general description given above and detailed description given below, serve to explain the principles of the invention. Such description makes reference to the annexed drawings. The drawings are only for the purpose of illustrating preferred embodiments of the invention and are not to be treated as limiting the invention.

In the drawings:

FIG. 1b illustrates the slope compensation signal utilized in the regulation of FIG. 1a.

Throughout the above-mentioned drawings, identical reference numerals are used to designate the same or similar component parts in most instances.

DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art, like numbers refer to like elements throughout. In other instances, well-known structures and devices are shown in block diagram form in order to avoid unnecessarily obscuring the present disclosure.

Figure 3:
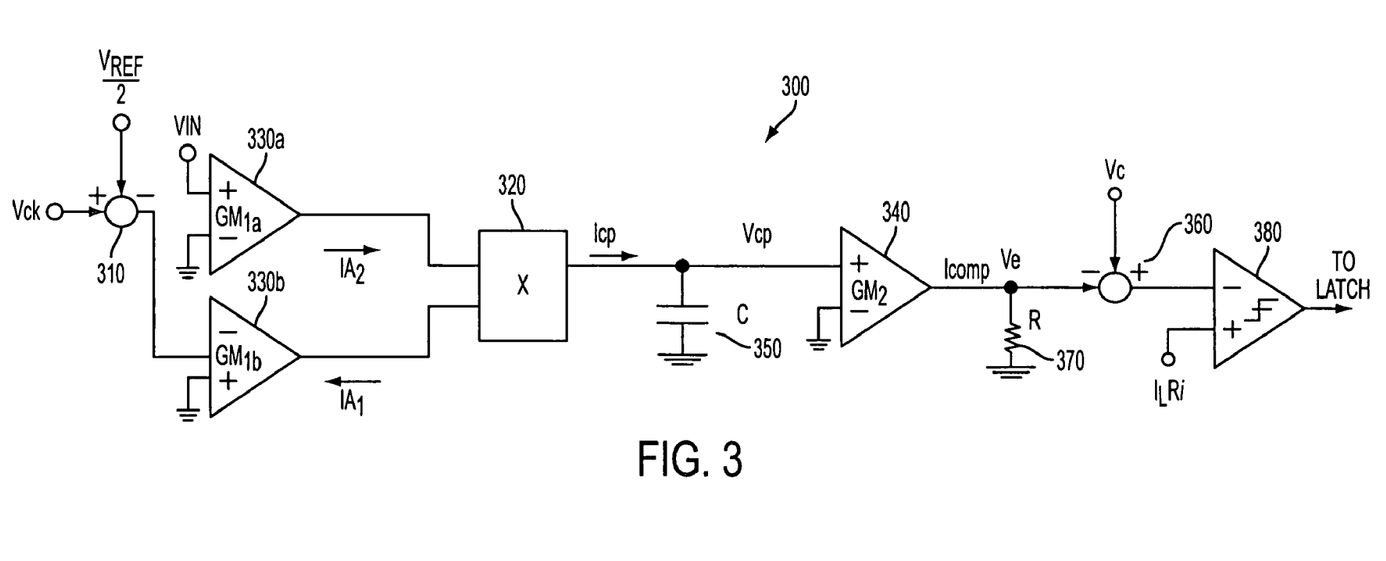
FIG. 3 illustrates an exemplary block diagram of the slope compensation circuit of the present invention.

FIG. 3 illustrates an exemplary block diagram of the slope compensation circuit of the present invention. As explained in further detail below, the slope compensation circuit provides a second order slope compensation signal that is utilized within the current mode switching regulator controller to maintain stable operation of the switching regulator. Importantly, the slope compensation signal generated by the circuit varies in accordance with variations in the duty cycle of the switching regulator (i.e., the slope compensation signal is a function of the duty cycle).

Referring to FIG. 3, the exemplary embodiment of the slope compensation circuit 300 includes a first summer 310, which receives a reference voltage, $V_{REF}/2$, as a first input and a clock signal, $V_{CK}$ from FIG. 2b, as a second input. Signal $V_{CK}$ is defined in equation (10). The output of the first summer 310 and voltage to current converter 330b represents a linear signal, such as shown, for example, as waveform 22 in FIG. 2b and equation (12). The circuit 300 also includes a multiplier circuit 320, which receives the output of the first summer 310 as a first input signal and a signal, $V_{IN}$, representing the supply voltage as an equivalent current as a second input signal. As shown, the output of the summer 310 is coupled to the multiplier circuit 320 via a first transconductance amplifier 330b and $V_{IN}$ is coupled to the multiplier circuit 320 via a second transconductance amplifier 330a. Both the first transconductance amplifier 330b and the second transconductance amplifier 330a operate as voltage-to-current converters. As explained in further detail below, the output of multiplier circuit 320 corresponds to current signal, $I_{CP}$. The circuit 300 also includes a capacitor coupled to the output current $I_{CP}$ of multiplier circuit 320 for generating a voltage $V_{CP}$, which is defined by:

$$V_{CP} = \frac{1}{c}\int Gm_{1a} * V_{IN} * Gm_{1b} * \left(\frac{V_{REF}}{T_S}t - \frac{V_{REF}}{2}\right)dt =$$

$$\frac{Gm_{1a} * V_{IN} * Gm_{1b}}{c} * \frac{\left(t - \frac{T_s}{2}\right)^2}{2} * \frac{V_{REF}}{T_S}$$

Circuit 300 further includes a third transconductance amplifier 340 having a non-inverting input coupled to the voltage, $V_{CP}$, and an inverting input coupled to a reference voltage, which in the given embodiment is ground. The third transconductance amplifier 340 essentially applies the voltage, $V_{CP}$, as an equivalent current, to resistor 370 to generate voltage Ve. Circuit 300 also includes a second summer 360 having a first input coupled to Ve (i.e., the output of the second transconductance amplifier 340), and a second input which receives the control voltage, Vc (i.e., the difference between the desired output voltage and the actual output voltage). It is noted that summer 360 essentially implements the function of element 132 of FIG. 1a, but sums the slope compensation in the inverting input as opposed to the non-inverting input of a comparator 380. Finally, circuit 300 also includes the comparator 380, having a first input which is coupled to the output of the second summer 360 representing the control voltage, Vc, minus the slope compensation signal, Ve, and a second input which receives a signal $I_{SENSE}$ representing the measured input current of the switching regulator. The output of the comparator 380 is coupled to the main switch in the switching regulator (see, e.g., switch 114 in FIG. 1a) through latch 128 of FIG. 1a, and functions to control the operation of the switch, and therefore the delivery of current to the load.

It is noted that signal $V_{CK}$, as shown in FIG. 2b, is the clock signal having linear slope, $V_{REF}/T_S$, extending from 0 at t=0 to $V_{REF}$ at t=Ts. Since slope compensation is not required until t>Ts/2, this is the time when $V_{CK}=V_{REF}/2$ and the effective signal output by the first transconductance amplifier 330b is zero for 0<t≦Ts/2 because the first transconductance amplifier 330b cannot produce negative $I_{A1}$. The output of the multiplier circuit 320 is $I_{CP}$ and equals: 0 for 0<t≦Ts/2 (because $I_{A1}$=0), and $V_{IN}*(V_{CK}-V_{REF}/2)*Gm_{1a}*Gm_{1b}$ for Ts/2≦t≦Ts. Thus:

$$V_{CP} = \frac{1}{c}\int_O^t I_{CP} dx =$$

$$\frac{Gm_{1a}Gm_{1b}V_{IN}}{C}\left[\int_O^t \frac{V_{REF}}{T_s}x - \left(\frac{V_{REF}}{2}\right)dx\right] = \frac{Gm_{1a}Gm_{1b}V_{IN}V_{REF}}{CTs}\left[\int_O^t \left(x-\frac{T_s}{2}\right)dx\right] = \frac{Gm_{1a}Gm_{1b}V_{IN}V_{REF}}{CTs}\frac{\left(t-\frac{T_s}{2}\right)^2}{2}$$

It is further noted that the remaining signals output by the various components illustrated in FIG. 3 are essentially intermediate signals in the given signal processing implementation configuration of the present invention, which minimizes cost and maximizes accuracy, and do not have other physical interpretations, and moreover, may not exist in other signal processing implementations. The operation of circuit 300 is now described in more detail.

As noted above, in order to maintain stability, the slope compensation signal, Ve(t), as set forth in equations (6) and (7) equals:

$$Ve(t) = 0, 0 \le t \le T_s/2; \text{ and } Ve(t) = \frac{R_i V_{IN}}{2LT_s}\left(t-\frac{T_s}{2}\right)^2, \frac{T_s}{2} \le t \le T_s.$$

The time varying signal contained in equations (6) and (7) is explicitly t. $V_{ck}$ is the clock signal and is defined as:

$$V_{ck} = \frac{V_{REF}}{T_s}t, 0 \le t \le T_s. \quad (10)$$

As such, $V_{CK}$ is inherently a function of time, t. The parameters Ri, L and $V_{REF}$ are fixed parameters, where Ri corresponds to a resistor utilized to obtain the scaled voltage signal, $I_{SENSE}*Ri$, L corresponds to the inductor 118 of the regulator and $V_{REF}$ is a fixed reference voltage.

Thus, the time dependence required in equations (6) and (7) can be obtained from the clock waveform:

$$V_{CK} = \frac{V_{REF}}{T_s}t, \text{ (by subtracting its value at } t = T_s/2), \text{ and} \quad (11)$$

the output of the first summer 310 is equal to:

$$\left(\frac{V_{REF}}{T_s}t - \frac{V_{REF}}{2}\right) = \frac{V_{REF}}{T_s}\left(t-\frac{T_s}{2}\right). \quad (12)$$

As noted above, the output of the first summer 310 represents a linear signal, such as shown, for example, as waveform 22 in FIG. 2b when the negative part of the signal is discarded.

It is noted that in the signal processing occurring in the present invention, there are parameters that are constant and fixed, and parameters that vary as functions of time and therefore have inherent time dependence. In the exemplary implementation disclosed herein, the circuit components R, L, C, etc. are all fixed values and only the currents and voltages vary as a function of time, and therefore have time dependence. In this regard it is noted that equation (12) defines the output of the first summer 310, where the inputs are $V_{CK}=(V_{REF}/TS)*t$ and $V_{REF}/2$ so the output sum (including sign) is as set forth in equation (12), which is an intermediate signal processing variable of the given implementation (that happens to correspond to the waveform 22 illustrated in FIG. 2b). $V_{IN}$ is the supply voltage and may be different in different applications or at different times, but is not considered to be time varying at time scales on the order of Ts.

The output of the first summer 310 is then multiplied by $V_{IN}$ utilizing the multiplier circuit 320, and the output of the multiplier circuit 320 is the current signal $I_{CP}$. Current signal, $I_{CP}$, is applied to the capacitor 350 so that a voltage signal, $V_{CP}$, is generated across the capacitor 350. Specifically, $I_{CP}$ and $V_{CP}$ are defined as (since the voltage across a capacitor is the integral of the current through the capacitor):

$$I_{cp} = Gm_{1a}Gm_{1b}\frac{V_{IN}V_{REF}}{T_s}\left(t-\frac{T_s}{2}\right), \text{ and} \quad (12)$$

$$Vcp = \frac{1}{C}\int I_{cp} dt = \frac{Gm_{1a}Gm_{1b}V_{IN}V_{REF}}{2C*T_s}\left(t-\frac{T_s}{2}\right)^2, \quad (13)$$

where $Gm_{1a}$ and $Gm_{1b}$ correspond to the transconductance of the first transconductance amplifier 330a and second transconductance amplifier 330b, respectively, and C corresponds to the capacitance of capacitor 350. As can be concluded from the foregoing equation, $V_{CP}$ is a non-linear ramp signal which is scaled in accordance with the measured current. This non-linear ramp signal, $V_{CP}$, is then supplied as an input signal to the third transconductance amplifier 340.

The third transconductance amplifier 340 functions to generate a current signal, $I_{COMP}$, which is defined as:

$$I_{comp} = Gm_2 Vcp = Gm_2 Gm_{1a}Gm_{1b}\frac{V_{IN}V_{REF}}{2T_sC}\left(t-\frac{T_s}{2}\right)^2, \quad (14)$$

where $Gm_2$ corresponds to the transconductance of the third transconductance amplifier 340. The output of the third transconductance amplifier 340 is coupled to the resistor 370 and the second summer 360 such that $I_{COMP}*R$, which corresponds to the slope compensation signal Ve(t), is subtracted from the control voltage signal, Vc(t). As such, Ve(t) can be defined as:

$$Ve(t) = \frac{RGm_2 Gm_{1a}Gm_{1b}V_{IN}V_{REF}}{2T_sC}\left(t-\frac{T_s}{2}\right)^2. \quad (15)$$

For proper scaling, this must match the desired Ve(t) from equation (6), which is obtained by choosing the free parameters:

$$\frac{RGm_2 Gm_{1a} Gm_{1b} V_{IN} V_{REF} \left(t - \frac{T_s}{2}\right)^2}{2T_s C} = \frac{R_i V_{IN} \left(t - \frac{T_s}{2}\right)^2}{2LTs}, \quad (16)$$

This relation between the circuit parameters and physical system parameters hold true if the product of the circuit parameters:

$$\frac{R * Gm_2 * Gm_{1a} * Gm_{1b} * V_{REF}}{C} = \frac{Ri}{L} \quad (17)$$

It is noted again that the slope compensation circuit 300 illustrated in FIG. 3 can be utilized in place of the corresponding sections of the current-programmed controller 124 of FIG. 1a to generate a slope compensation signal and control the operation of the latch and main switch 114 within the switching regulator. Thus, the slope compensation circuit 300 can be utilized with the buck-type switching regulator illustrated in FIG. 1a. Furthermore, although not shown, the slope compensation circuit 300 of the present invention can be utilized with all types of current mode switching regulators, and is not limited to use with buck-type switching regulators. It is noted that the exemplary slope compensation circuit of FIG. 3 does not illustrate the latch (corresponding to element 128 of FIG. 1a) as it is within the sequencer in hardware implementation of the regulator.

Figure 4A:
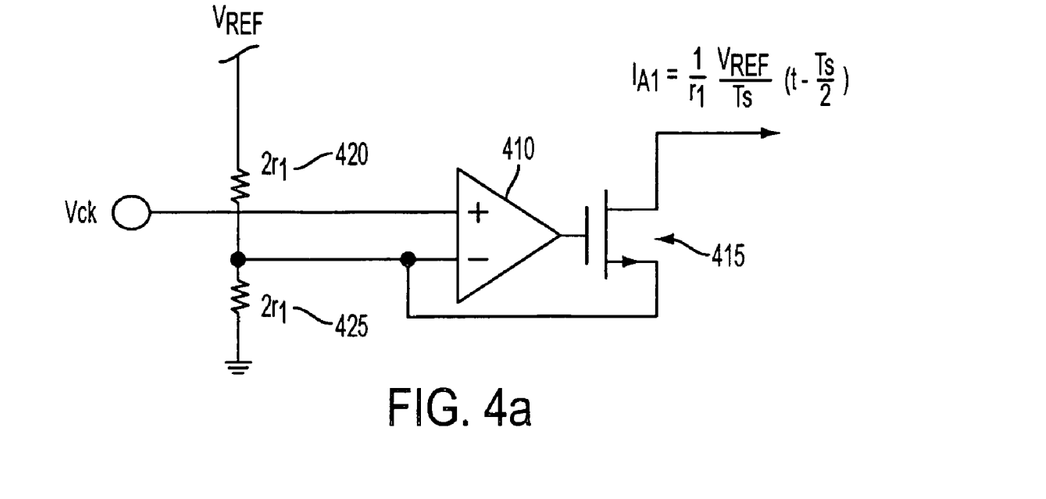
FIG. 4a illustrates an exemplary implementation of the summer (310) shown in FIG. 3, and includes the voltage to current converter (330b) required by the input of the multiplier circuit (320).

FIG. 4a illustrates an exemplary implementation of the summer 310. It is noted that numerous other implementations of the summer and the other components forming the slope compensation circuit 300 are possible, and the present invention is not limited to the implementations disclosed herein. Referring to FIG. 4a, the summer 310 comprises an amplifier 410 having a non-inverting input which is coupled to the clock signal, $V_{CK}$, and an inverting input which is coupled through resistor 420 to the reference voltage, $V_{REF}$. Resistors 420 and 425 function to create an equivalent voltage of $V_{REF}/2$ connected to the inverting input of amplifier 410 and the source of NMOS 415 through a resistor of value $r_1$. NMOS transistor 415 has its gate coupled to the output of the amplifier 410, source terminal coupled to the inverting terminal of the amplifier 410, and its drain current represents the output of the summer 310 in the form of a current, which is coupled to the input of multiplier circuit 320. The value of current signal present at the drain, which is referred to as $I_{A1}$, and which is input into the multiplier circuit 320 is equal to:

$$I_{A1} = \frac{V_{REF}}{r_1 Ts} \left(t - \frac{Ts}{2}\right) \quad (18)$$

Figure 4B:
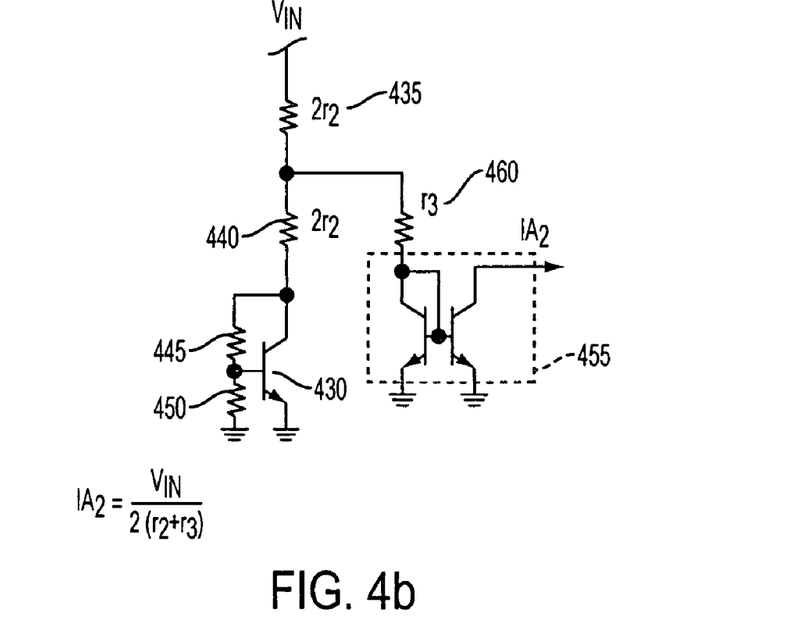
FIG. 4b illustrates an exemplary circuit for generating the $V_{IN}$ signal input as a current $I_{A2}$ into the multiplier circuit (320) shown in FIG. 3

The other signal input into the multiplier circuit 320, which is referred to as $V_{IN}$ above, can be generated as a current $I_{A2}$ utilizing the circuit illustrated in FIG. 4b. Referring to FIG. 4b, the circuit includes a NPN transistor 430 coupled to $V_{IN}$ via two equal resistors 435 and 440. The circuit further includes equal value resistors 445 and 450, which function to bias the collector of NPN transistor 430 at two times the voltage at the input of a current mirror circuit 455. Finally, the circuit also includes the current mirror circuit 455 coupled to the node connecting resistors 435 and 440 via resistor 460. The output of the current mirror circuit 455 is defined as $I_{A2}$, and is equal to:

$$I_{A2} = V_{IN}/2(r_2 + r_3) \quad (19)$$

Figure 5:
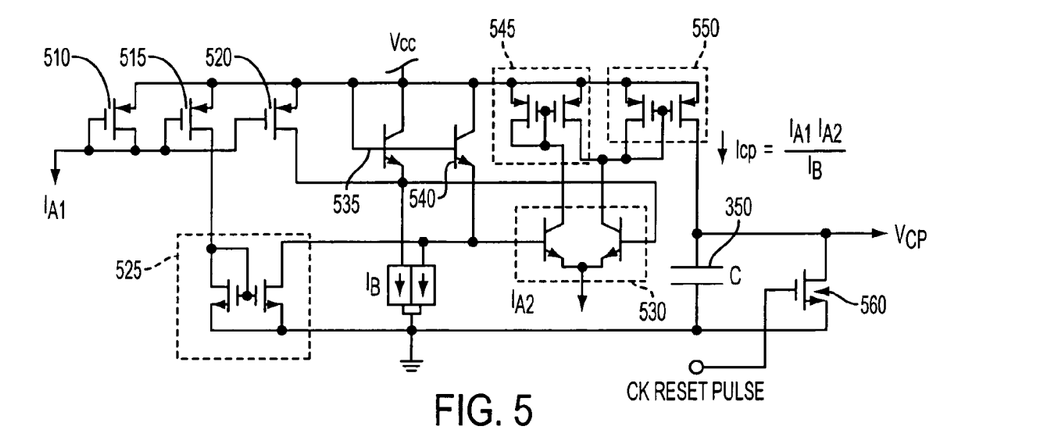
FIG. 5 illustrates an exemplary implementation of the multiplier and integrator circuit, with current output $I_{CP}$ and capacitor (350).

FIG. 5 illustrates an exemplary implementation of the multiplier circuit 320 and integrator 350. Referring to FIG. 5, the circuit includes three PMOS transistors 510, 515 and 520, which operate as a single input dual identical output current mirror which receives $I_{A1}$ as an input signal. The circuit further includes an additional current mirror circuit 525 which inverts the polarity of one output from the drain of transistor 515 and couples it to diode connected bipolar transistor 540. The other current mirror output from PMOS 520 is connected to a second diode connected bipolar transistor 535, which is closely matched to transistor 540. Diodes 535 and 540 are also biased by identical value current sinks $I_B$, where $I_B > I_{A1}(max)$, so that the diodes are always forward biased. The differential voltage between diodes 535 and 540 is input into a differential amplifier 530 consisting of matched NPN transistors, which are also matched to diodes 535 and 540, and identical current mirrors 545 and 550. This circuit constitutes a current output, single quadrant analog multiplier whose output current is the product of input currents $I_{A1}$ and $I_{A2}$ scaled by a factor related to the value of the bias current $I_B$, where:

$$I_{CP} = I_{A1} * I_{A2}/I_B \quad (20).$$

Finally, the circuit includes a capacitor 350, which corresponds to capacitor 350 in FIG. 3, and a transistor 560, which is coupled in parallel with the capacitor 350. The voltage across the capacitor 350 corresponds to the voltage $V_{CP}$ illustrated in FIG. 3. The transistor 560 has a gate terminal coupled to a clock reset pulse from 126 of FIG. 1a, and functions to reset voltage $V_{CP}$ to zero volts upon receipt of a clock reset signal (at a time t=Ts) in order to prevent accumulation of integrator drifts.

Figure 6:
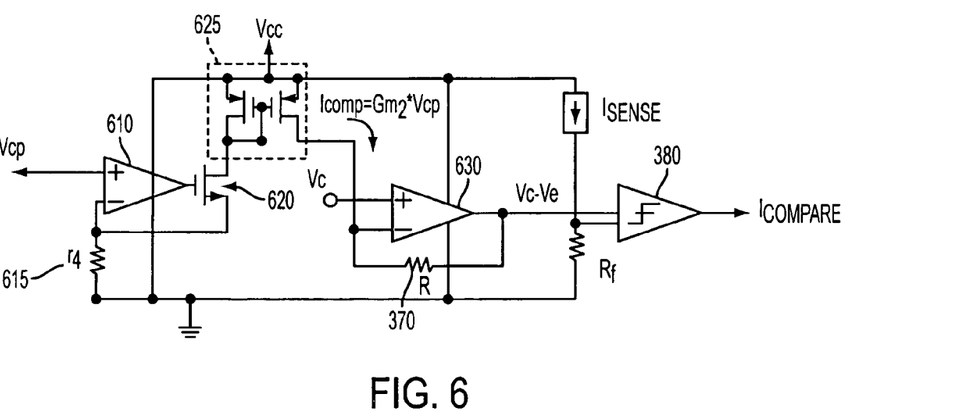
FIG. 6 illustrates an exemplary implementation of the transconductance amplifier (340), implemented by resistor $R_4$ (615), NMOS transistor (620) and current mirror (625), and resistor (370) and the second summer (360) implemented with amplifier (630) and comparator 380.

FIG. 6 illustrates an exemplary implementation of the third transconductance amplifier 340 and the second summer 360 and comparator 380. Referring to FIG. 6, the circuit includes a first amplifier 610 having a non-inverting input, which receives the $V_{CP}$ signal, and an inverting input which is coupled to a reference voltage (e.g., ground) via resistor 615. The circuit further includes an NMOS transistor 620 having a gate terminal coupled to the output of the amplifier 610 and a source terminal coupled to the inverting input of the amplifier 610; and a current mirror circuit 625 coupled to the drain of the transistor 620. Thus, the drain current of transistor 620 and output current of the current mirror 625 is equal to $V_{CP}/r4$ Continuing, the circuit also includes a second amplifier 630 having an inverting input coupled to an output of the current mirror 625 and a non-inverting input coupled to the control voltage signal, Vc. The output of the second amplifier 630 is also coupled back to the inverting terminal via resistor 635. Thus, the output of the amplifier 630 equals Vc minus Ve. Finally, the circuit includes a comparator 380 which receives the output of the second amplifier 630 as a first input signal and the signal representing the measured inductor current times resistor $R_f$ as a voltage as a second input signal. It is noted that the comparator 380 performs essentially the same function as the comparator 130 of FIG. 1a, however, the slope compensation signal (i.e., in the output of amplifier 630 as Ve) is summed into the inverting rather than the non-inverting input of the comparator 380 (with appropriate sign).

It is noted that all of the sensed currents and voltages utilized in the slope compensation circuit of the present invention are scaled versions relative to the actual current and voltage values. This scaling is utilized in order to increase the overall implementation efficiency of the slope compensation circuit and to minimize power dissipation, so it is a practical necessity.

Figure 7:
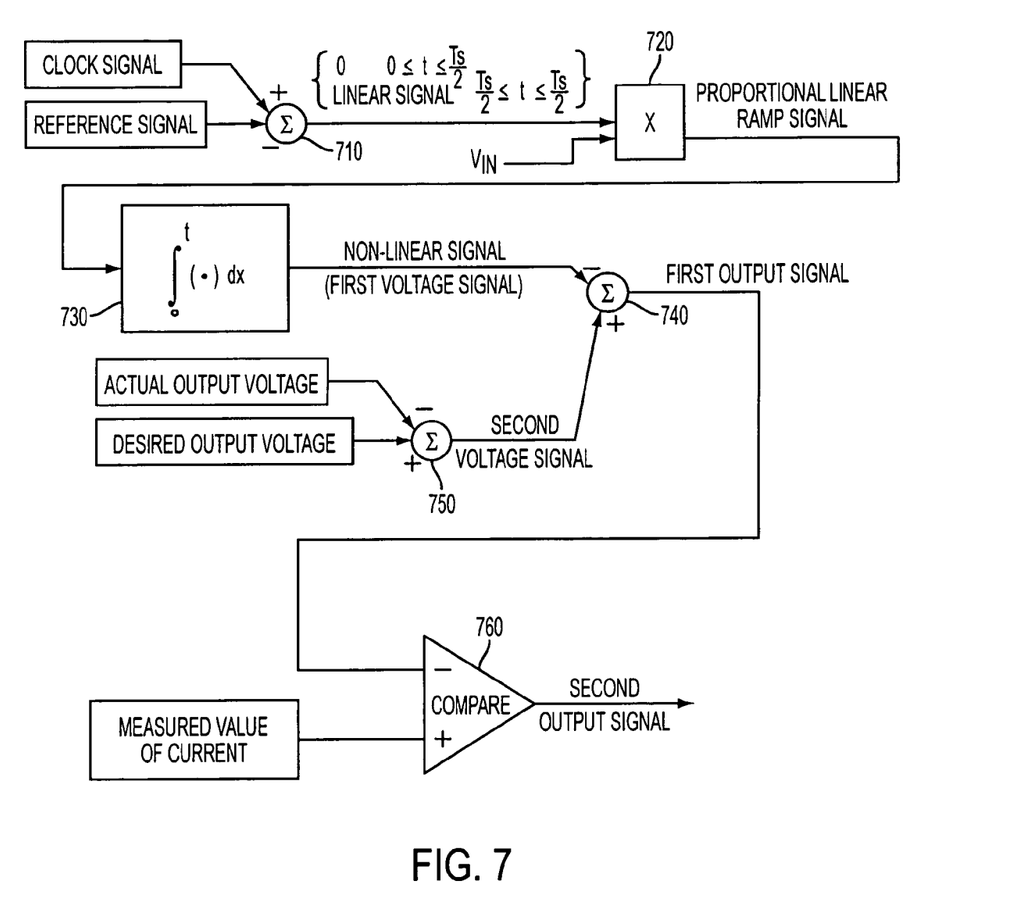
FIG. 7 is a block diagram which summarizes the operation of the present invention.

FIG. 7 is a block diagram which effectively summarizes the operation of the present invention as detailed above. Referring to FIG. 7, the clock signal and the reference signal are coupled to a first summer 710 as input signals, and by discarding negative value signals, the output of the summer is 0 for the period $0 \leq t \leq Ts/2$, and a linear signal for the period $Ts/2 \leq t \leq Ts$. The output of the summer 710 and an input voltage signal, $V_{IN}$, are coupled to the input of a multiplier 720, which outputs a proportional linear ramp signal. The output of the multiplier 720 is coupled to an integrator 730, which outputs a non-linear compensation ramp signal having a value of 0 for the period $0 \leq t \leq Ts/2$, and a value of $(t-Ts/2)^2$ for the period $Ts/2 \leq t \leq Ts$. The output of the integrator 730 is an input signal to a second summer 740. The other input to the second summer 740 is a signal representing the difference between the actual output voltage and the desired output voltage, which is obtained utilizing a third summer 750. The output of the second summer 740 is compared to the measured value of the current flowing within the regulator utilizing comparator 760, and the output of the comparator 760 is utilized to control the current flow within the regulator.

Thus, as FIG. 7 makes clear, the functions performed by the present invention include: (1) deriving a ramp signal from the internal clock that is 0 for the period $0 \leq t \leq Ts/2$, and $(t-Ts/2)$ for the period $Ts/2 \leq t \leq Ts$; (2) scaling the ramp signal derived from the clock to the amplitude of the measured switch current (this relates the value of $V_{IN}$ to $V_{REF}$); (3) obtain the function $(t-Ts/2)^2$ via the integration to generate a non-linear slope compensation signal; (4) summing the non-linear slope compensation signal with the measured and scaled switch current; and (5) comparing the non-linear slope compensated current signal with the voltage error signal, which is defined by $V_{DESIRED}-V_{OUT}$), which in itself may contain frequency compensation.

It is noted that one of the important aspects of the present invention is the use of the time domain integrator 730 to generate the non-linear ramp compensation signal. As is clear from FIG. 7, the multiplier 720 only performs the scaling to match the signal levels of the current sense and clock (i.e., it does not generate the non-linear ramp compensation signal). It is also noted that while the scaling function performed by the multiplier 720 is shown as being performed prior to the time integration (utilized to produce the non-linear compensation signal), it could also be performed after the time integration. In other words, step (2) above can be performed before or after step (3). Furthermore, it is important that step (1) precede step (3) so that the time varying clock signal is integrated.

As mentioned above, the slope compensation circuit of the present invention provides numerous advantages over the prior art. Most importantly, the amount of slope compensation provided by the circuit of the present invention varies in accordance with variations in the duty cycle during operation of the regulator such that only the amount of slope compensation necessary to prevent instability is provided. In other words, the slope of the compensation signal is a non-linear continuous function of the duty cycle of the regulator. As such, there is no additional degradation in the dynamic range of the controller, which results when slope compensation in excess of what is required is provided to the regulator.

Another advantage of the present invention is that the variable slope compensation signal is provided utilizing a simple, cost effective circuit, thereby providing a practical solution to the aforementioned problems of the prior art. Furthermore, the only measured variables are those already used by a conventional current mode switching regulator.

While specific embodiments of, and examples for, the invention are described herein for illustrative purposes, various equivalent modifications are possible within the scope of the invention, as those skilled in the relevant art will recognize.

It is intended that all matter contained in the above description and shown in the accompanying drawings shall be interpreted as illustrative and not in a limiting sense. It is also to be understood that the following claims are intended to cover all generic and specific features herein described and all statements of the scope of the various inventive concepts which, as a matter of language, might be said to fall therebetween.

What is claimed is:

1. A slope compensation circuit for use in a current mode switching regulator, said slope compensation circuit comprising:

a first summer circuit for receiving a clock signal and a reference signal as input signals, and for generating a linear signal as an output signal;

a multiplier and integrator circuit for multiplying said linear signal with an input voltage signal, and integrating the result for generating a non-linear signal which varies based on a measured value of a current flowing within said current mode switching regulator;

a second summer circuit for receiving a first voltage signal corresponding to said non-linear signal and a second voltage signal indicating the difference between an actual voltage level of said current mode switching regulator and the desired voltage level of said current mode switching regulator, and for generating a first output signal which represents the second voltage signal minus the first voltage signal; and a comparator for receiving the first output signal from said second summer as a first input, and said measured value of a current flowing within said current mode switching regulator as a second input, and for generating a second output signal utilized to control current flow within said current mode switching regulator.

2. The slope compensation circuit of claim 1, wherein the only measured signals utilized by the slope compensation circuit include the current flowing through a high-side switch contained in said current mode switching regulator and the output voltage level of said current mode switching regulator.

3. The slope compensation circuit of claim 1, further comprising a transconductance amplifier for coupling said multiplier and integrator circuit to said second summer circuit, said transconductance amplifier operative for generating a current signal based on the output of said multiplier and integrator circuit.

4. The slope compensation circuit of claim 1, further comprising a first transconductance amplifier for coupling said first summer circuit to said multiplier and integrator circuit, and a second transconductance amplifier for coupling said reference signal to said multiplier and integrator circuit, said first transconductance amplifier and said second transconductance amplifier operate as voltage to current converters.

5. The slope compensation circuit of claim 1, wherein said input voltage signal corresponds to the input voltage of said current mode switching regulator.

6. The slope compensation circuit of claim 1, wherein current flowing within said current mode switching regulator corresponds to current flow through a high-side switch contained in said current mode switching regulator.

7. The slope compensation circuit of claim 1, wherein said actual voltage level of said current mode switching regulator corresponds to an output voltage of said current mode switching regulator.

8. The slope compensation circuit of claim 1, wherein said multiplier and integrator circuit only generates an output for positive input signals.

9. A current mode switching regulator for regulating an output voltage, said current mode switching regulator comprising:
   a switch;
   a controller coupled to said switch, said controller governing the operational state of said switch so as to control current flow to a load; and
   a slope compensation circuit; said slope compensation circuit including:
      a first summer circuit for receiving a clock signal and a reference signal as input signals, and for generating a linear signal as an output signal;
      a multiplier and integrator circuit for multiplying said linear signal with an input voltage signal, and integrating the result for generating a non-linear signal which varies based on a measured value of a current flowing within said switch;
      a second summer circuit for receiving a first voltage signal corresponding to said non-linear signal and a second voltage signal indicating the difference between an actual voltage level of said current mode switching regulator and the desired voltage level of said current mode switching regulator, and for generating a first output signal which represents the second voltage signal minus the first voltage signal; and
      a comparator for receiving the first output signal from said second summer as a first input, and said measured value of a current flowing within said switch regulator as a second input, and for generating a second output signal utilized to control current flow through said switch.

10. The current mode switching regulator of claim 9, wherein the only measured signals utilized by the slope compensation circuit include the current flowing through the switch and the output voltage level of said current mode switching regulator.

11. The current mode switching regulator of claim 9, wherein said slope compensation circuit further comprises a transconductance amplifier for coupling said multiplier and integrator circuit to said second summer circuit, said transconductance amplifier operative for generating a current signal based on the output of said multiplier and integrator circuit.

12. The current mode switching regulator of claim 9, wherein said slope compensation circuit further comprises a first transconductance amplifier for coupling said first summer circuit to said multiplier and integrator circuit, and a second transconductance amplifier for coupling said reference signal to said multiplier and integrator circuit, said first transconductance amplifier and said second transconductance amplifier operate as voltage to current converters.

13. The current mode switching regulator of claim 9, wherein said input voltage signal corresponds to the input voltage of said current mode switching regulator.

14. The current mode switching regulator of claim 9, wherein said actual voltage level of said current mode switching regulator corresponds to an output voltage of said current mode switching regulator.

15. A method of generating a slope compensation signal for use in a current mode switching regulator, said method comprising the steps of:
   summing a clock signal and a reference signal so as to generate a linear ramp signal;
   multiplying said linear ramp signal with an input voltage signal so as to generate a scaled signal which varies based on a measured value of a current flowing within said current mode switching regulator;
   integrating the linear scaled signal with respect to time to generate a non-linear ramp signal;
   summing a first voltage signal corresponding to said non-linear signal and a second voltage signal indicating the difference between an actual voltage level of said current mode switching regulator and the desired voltage level of said current mode switching regulator so as to generate a first output signal which represents the second voltage signal minus the first voltage signal; and
   comparing the first output signal and said measured value of a current flowing within said current mode switching regulator, and generating a second output signal utilized to control current flow within said current mode switching regulator based on the result of said comparison.

16. The method of claim 15, wherein the only measured signals utilized are the current flowing through a high-side switch contained in said current mode switching regulator and the output voltage level of said current mode switching regulator.

17. The method of claim 15, wherein said input voltage signal corresponds to the input voltage of said current mode switching regulator.

18. The method of claim 15, wherein current flowing within said current mode switching regulator corresponds to current flow through a high-side switch contained in said current mode switching regulator.

19. The method of claim 15, wherein said actual voltage level of said current mode switching regulator corresponds to an output voltage of said current mode switching regulator.

* * * * *